Aug. 12, 1969    M. SCHWARTZ    3,460,836
MAP GAME APPARATUS COMPRISING ADHESIVE OVERLAY
MEMBERS APPLICABLE TO THE MAP
Filed May 19, 1967

INVENTOR
Milton Schwartz

BY *Clive H. Bramson*

ATTORNEY

United States Patent Office 3,460,836
Patented Aug. 12, 1969

3,460,836
MAP GAME APPARATUS COMPRISING ADHESIVE OVERLAY MEMBERS APPLICABLE TO THE MAP
Milton Schwartz, 29 Coventry Road,
Syosset, N.Y. 11791
Filed May 19, 1967, Ser. No. 639,772
Int. Cl. A63f *3/04*
U.S. Cl. 273—135                               6 Claims

ABSTRACT OF THE DISCLOSURE

A map game including a board having a map of the United States and a placard disposed adjacently of said map, the map being divided into regions having different color designations and each consisting of a plurality of states, said placard being removably connected to said board and having a plurality of overlay members removably secured thereto, the overlay members being arranged into groups each of a different color designation corresponding to that of one of said regions, said overlay members each having a reusable adhesive surface whereby after removal of said overlay members from said placard, said members are adherable to selected portions of said map, and securement means in the form of a flap member and an adhesive strip for removably uniting said board and placard. The game is played by applying the overlay members to the map within the outlines of States whose vehicle license plates are observed by the players.

---

This invention relates generally to geographic amusement devices and more particularly to a map game wherein the States of the United States of America are represented on a map thereof, a removable and replaceable placard containing adhesive overlay members being secured to and forming a part of the game. The map is divided into various contiguous land regions each consisting of various States, the States within a land region being similarly color designated, and said overlay members being divided into groups which are respectively color designated to correspond with respective land regions.

Whereas the amusement of children is always of primary concern, the present map game has for an object the provision of such amusement while the children are journaying by automobile, an educational end being also provided thereby.

Another object of the present invention is to provide a map game which is reusable, the placard supplying the overlay members being replaceable and readily secured to the board.

Another object of the instant invention is to provide a device of the foregoing character wherein the amusement nature thereof is analogous to the game of Bingo, whereby once the automobile license plates of all the States within a single land region are observed and covered with overlay members, "Bingo" is achieved.

A further object of this invention resides in the provision of a map game including novel securement means for removably connecting the parts thereof.

A still further object of this invention is to provide a map game which may be utilized, e.g., by oil companies, filling stations and the like, as an advertising medium.

Another general object of the present invention is to provide a device of the described character which will be simple in structure, economical of manufacture and highly effective in use.

Other objects and advantages of the instant map game will be set forth in part hereinafter and in part will be obvious herefrom, or may be learned by practice of the invention, the same being realized and attained by means of the structure defined and pointed out in the appended claims.

The accompanying drawings, referred to herein and constituting a part hereof, illustrate one embodiment of the invention, and together with the description serve to explain the principles of the invention.

Figure 1:
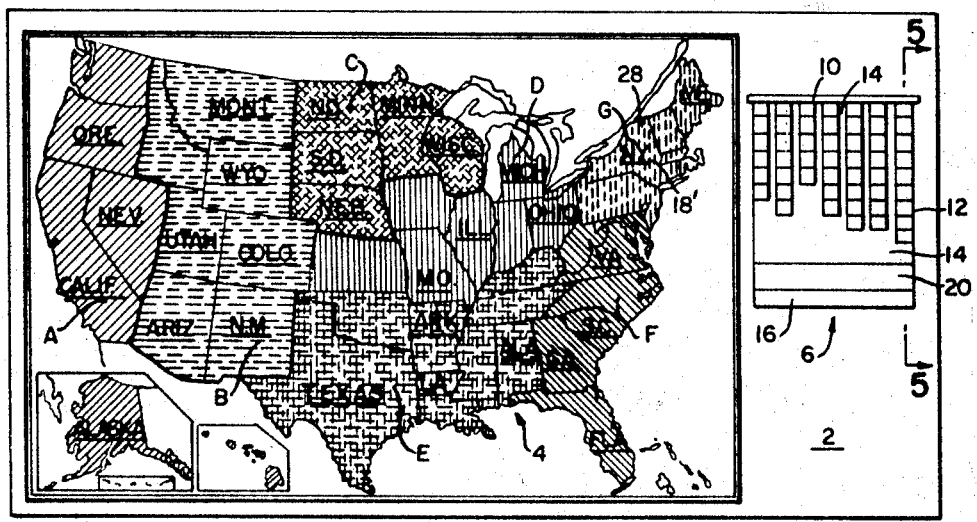
FIGURE 1 is a plan view of the map game, illustrating the placard secured at one end thereof to the board.

Referring now in detail to the present preferred embodiment of the invention illustrated in the accompanying drawings, FIGURE 1 shows the assembled map game designated generally by numeral 1, said map game being comprised of board 2, a pictorial representation 4 of a land area, i.e., the United States of America, and a placard 6 disposed adjacently of said land area.

Figure 5:
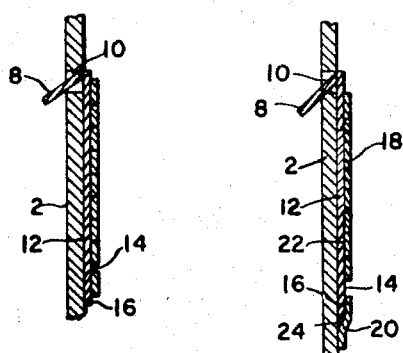
FIGURE 5 is a fragmentary cross-sectional view of the board and the placard partially secured thereto taken along line 5—5 of FIGURE 1.
Figure 6:
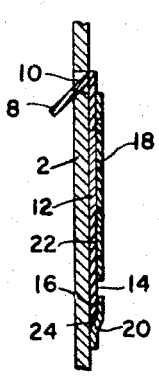
FIGURE 6 is a view similar to FIGURE 5 wherein the adhesive strip has been repositioned and is in use as securement means coacting with the board.

Placard 6, as shown, is of generally rectangular configuration, as is board 2, although it will be appreciated that either may be of any other suitable shape. Said placard includes flap member 8 which is integral therewith and located at one end thereof. A slot or slotted portion 10 is provided within said board 2, as shown, said flap member being receivable into said slotted portion to thereby unite said board and placard as shown in FIGURES 1, 5 and 6.

Placard 6 further comprises a supporting sheet 12 with which flap 8 is integral, said sheet having a relatively low friction area 14 which is preferably a waxed surface, said low friction area extending the length L of said placard and across the width thereof. The surface 16, extending vertically the distance H and across the width of said placard, is non-waxed and is, therefore, of relatively higher frictional character compared with said area 14.

Accordingly, overlay members 18 and adhesive strip 20, which are respectively provided with adhesive surfaces 22 and 24, will adhere to said low friction area 14 and be readily removable therefrom.

As aforedescribed, insertion of said flap 8 within slot 10 will secure one end of said placard to said board, it being desirable, however, to more fully unite said placard and board in order to further facilitate removal of said overlay members therefrom. To that end adhesive strip 20 is removed from said low friction surface 14 and replaced upon said high friction surface 16, in the manner shown in FIGURE 4 of the drawings. That is, an approximate longitudinal half of said adhesive strip is caused to adhere to said area 16, whereupon the other approximate longitudinal half thereof is secured to board 2 as shown in FIGURE 6 to thereby secure the other end of said placard to said board.

With further reference to FIGURE 1, it will be observed that the United States of America land area 4 includes different land regions, A, B, C, D, E, F and G, said land regions being further divided into six, seven, five, seven, eight, eight, and nine land boundaries or States, respectively, each land region and the States thereof being differently color designated.

Figure 2:
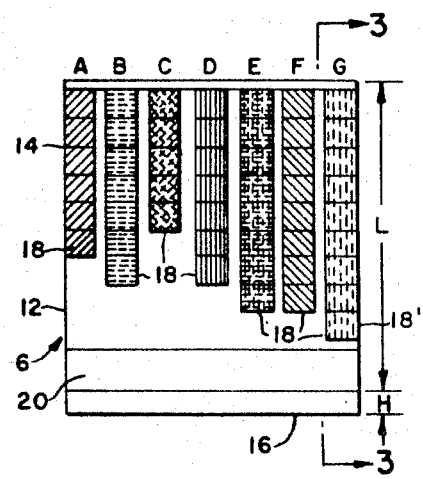
FIGURE 2 is an enlarged view of the placard shown apart from the board.

With reference now to FIGURE 2 of the drawings, it will be observed that said overlay members 18 are arranged in seven groups of color designations corresponding to respective color designations of the respective land regions and the States therewithin. The number of overlay members included in each group is in correspondence with the number of States of the respective land regions. The overlay members comprising the group corresponding with land region A, e.g., being six in number, are formed on a single strip, as shown, and are die cut for ease of separation from one another.

Figures 3, 4:
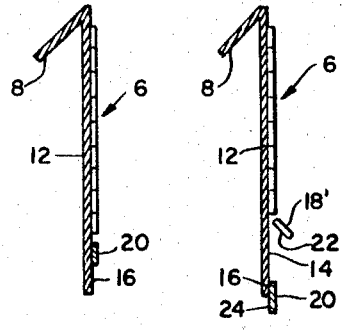
FIGURE 3 is a cross-sectional view of the placard taken along line 3—3 of FIGURE 2.
FIGURE 4 is a cross-sectional view of the placard illustrating an overlay member in the process of being removed therefrom and the adhesive strip repositioned to serve as securement means.
Figure 7:
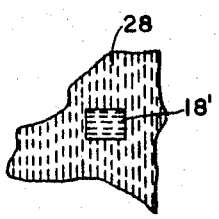
FIGURE 7 is an enlarged view of the land boundary of the State of New York, an overlay member having been affixed over the State name.

As shown in FIGURE 4, overlay member 18' has been severed from the group G of nine overlay members for placement over "N.Y." as shown in FIGURE 7, the New York State land boundary 28 being isolated in said FIGURE 7 for purposes of illustration. The adhesive coating 22 provided on a surface of said overlay member renders the latter self-adhering to the New York land boundary.

Similarly, each overlay member can be removed with respect to the placard and placed over a respective land boundary.

In playing the above-described map game where, for example, two children are taking a motor trip with their parents, each child will have a map game of his own. Each child will be observing the license plates of other automobiles, and as cars from various States are sighted overlay members are removed from appropriate groups on the placard and placed over the names of the States of which automobiles are sighted. The player to first succeed in covering all the State names lying within any single land region declares "Bingo" and is the winner.

Although the preferred embodiment of the map game has been described, it will be understood that within the purview of this invention various changes may be made in the forms, details, proportion, thickness, shapes and materials of which the parts are formed, the arrangement and combination thereof and their mode of operation.

What is claimed is:

1. A map game apparatus comprised of a board having thereon a pictorial representation of a land area and a placard disposed adjacently thereof, said placard being removably associated with said board and having a plurality of overlay members removably secured thereto, said overlay members each having a reusable adhesive surface whereby after removal of said overlay members from said placard said members are adherable to selected portions of said land area representation, securement means for removably uniting said board and placard, said land area representation being divided into representations of different land regions each having a respective color designation, each said land region representation being divided into a plurality of representations of subregions, said overlay members being arranged in groups, each group being of a color designation corresponding to the color designation of a different one of the representations of different land regions, each of said subregions being an area which issues vehicle license plates distinguishable from similar plates issued by each of the other subregions.

2. A map game apparatus as set forth in claim 1 wherein said securement means comprises a slotted portion within said board located adjacently of said land area representation, and a flap member integral with said placard located at one end thereof, said flap member being received into said slotted portion to thereby unite said board and placard.

3. A map game apparatus as set forth in claim 2 wherein the surface of said placard includes relatively high and low friction areas, said overlay members and a separate adhesive strip being adhered to said low friction area, said high friction area being located along the end of said placard opposite to the end thereof at which said flap is located.

4. A map game apparatus as set forth in claim 2 wherein said securement means further comprises an adhesive strip, part of which is secured to said placard at the end thereof opposite to the end at which said flap is located, and a part of which is secured to said board.

5. A map game apparatus as set forth in claim 1 wherein the number of overlay members included in each said group is equal to the number of subregions in the corresponding region.

6. A map game apparatus as set forth in claim 5 wherein said land area is the United States of America, the subregions are States, fifty in number, and said overlay members of each group are separately connected, said groups collectively including fifty overlay members.

References Cited

UNITED STATES PATENTS

| 237,012 | 1/1881 | Hall. | |
|---|---|---|---|
| 2,000,369 | 5/1935 | Zeiss. | |
| 2,177,790 | 10/1939 | Scott. | |
| 2,585,924 | 2/1952 | Freedman et al. | 273—137 |
| 3,368,816 | 2/1968 | Milazzo et al. | 273—134 |

DELBERT B. LOWE, Primary Examiner